United States Patent Office 3,556,933
Patented Jan. 19, 1971

3,556,933
REGENERATION OF AGED-DETERIORATED WET STRENGTH RESINS
Laurence Lyman Williams, Stamford, and Anthony Thomas Coscia, South Norwalk, Conn., assignors to American Cyanamid Company, Stamford, Conn., a corporation of Maine
No Drawing. Filed Apr. 2, 1969, Ser. No. 812,851
Int. Cl. C08f 27/18; C08g 9/00; D21h 3/58
U.S. Cl. 162—167                                  6 Claims

ABSTRACT OF THE DISCLOSURE

Wet strengthening efficiency of aged, deteriorated aqueous solutions of water-soluble sulfite-stabilized thermosetting normally cationic glyoxalated polyvinylamide wet strength resins is rejuvenated by addition of formaldehyde to said solutions.

---

The present invention relates to a method for regenerating the wet strengthening efficiency of age-deteriorated aqueous solutions of water-soluble sulfite-stabilized thermosetting normally cationic glyoxalated polyvinylamide wet strength resins.

The water-soluble sulfite-stabilized thermosetting cationic glyoxalated polyvinylamide wet strength resins possess an unusual and perhaps unique combination of properties, are capable of producing, without use of alum, paper which possesses excellent dry and wet tensile strengths in water of neutral pH, yet which loses its wet strength rapidly when slurried with alkaline water having a pH above 9.

A variety of these polyamides, and methods for their preparation are disclosed in our copending application Ser. Nos. 745,486 filed on July 17, 1968.

The polyvinylamides referred to are generally copolymers of a major amount of a vinylamide (e.g., acrylamide, methacrylamide, maleamide, vinylphthalamide, etc. or mixtures thereof) with a minor amount of a cationic vinyl monomer, (e.g., diallyl dimethyl ammonium chloride, 2-vinylpyridine, 2-methyl-5-vinylpyridine, diethylaminoethyl acrylate and vinylphenyl trimethyl ammonium chloride or mixtures thereof). Part of the foregoing monomers can be replaced with non-ionic vinyl monomers, (e.g., acrylonitrile, vinyl acetate, and ethyl acrylate) which act as diluents or spacers for the functional linkages. Typically, but not necessarily, the vinylamide component is greater than 75 mol percent of the whole. The polyvinylamides carry, attached to the amide substitutent thereof, a sufficient proportion of monofunctionally reacted glyoxal to render the polymers thermosetting, and such polymers for brevity are herein designated "thermosetting cationic glyoxalated polyvinylamide wet strength resins."

The strengthening properties of the polyvinylamides are ascribable to the glyoxal substituents which they carry. The ionic substituents perform the function of depositing the polymeric macromolecules on the fibers, and contribute little or nothing to the strengthening properties of the polymers.

Our first-mentioned application discloses that the tendency of these polyvinylamides to gel on aging in aqueous solution can be inhibited by adding sodium bisulfite or other water-soluble alkali metal (including ammonium or alkali earth metal) sulfite to the solution. It is a drawback of the method, however, that the strenghening effectiveness of the solution wanes with passage of time when the solutions are used as cationic additives (i.e., at neutral pH, without alum) in the manufacture of paper. In typical instances solutions of sulfite-stabilized polyvinylamides lose from about ⅓ to nearly all of their wet-strengthening effectiveness on storage for a few weeks under normal conditions (e.g., at a concentration of 10% by weight in water at pH 7.0 and at a temperature of 25° C.). In general, the larger the quantity of reacted sulfite which is present in the polyvinylamide and the higher the temperature at which the polyamide is stored, the more rapid and more severe is this loss in efficiency.

We have found that this trouble is ascribable to two alterations in the polyvinylamide, both ascribable to the bisulfite stabilizer. The first is a decrease in the cationic potential of the polyvinylamides, so that the polyvinylamide is less well adsorbed or retained by the fibers. The second is chemical inactivation of some or all of the glyoxal substituents. As a result, fewer cellulose-reactive substituents are present to produce the desired strengthening effect. Evidently, as the polymer ages after addition of the bisulfite, the added bisulfite causes the polyvinylamide to develop anionic functionalities which first offset and which may ultimately overcome the cationic potential of the polyvinylamide. Evidently this is accomplished by reaction of at least part of the bisulfite with at least part of the glyoxal substituents thereby inactivating the substituents affected.

The discovery has now been made that formaldehyde has the capability of reversing the above-described loss in efficiency and if desired reversing the loss substantially completely. According to the invention, formaldehyde in appropriate amount is added to the polyvinylamide solution at any time in the useful life of the solution (i.e., before it has set to a gel). Regeneration takes place rapidly, after which the solution can be used in the same manner as a cationic additive as if no degradation had occurred, and can be used in normal manner as a self-substantive thermosetting beater additive in the manufacture of wet- and dry-strength paper.

The invention possesses the following advantages:

(1) Regeneration of the polymers is approximately proportional to the amount of formaldehyde introduced. Accordingly, it is possible to regenerate the polyvinylamide substantially completely, so as to recover substantially 100% of its original strengthening effectiveness.

(2) The action of the formaldehyde is very rapid and usually is virtually instantaneous. Accordingly, it is unnecessary for deteriorated polymer solution to be treated in bulk, and the formaldehyde can be added to the papermaking furnish itself, for example at the fan pump. Evidently the polymer is regenerated about as fast as it is adsorbed on the fibers of the furnish.

(3) The reversal effected by the formaldehyde lasts sufficiently long to permit a large quantity of polyvinylamide solution to be treated and to permit the solution to be employed in the manufacture of paper in accordance with normal commercial procedures.

(4) The process is not affected by other substituents present. The process accordingly is generally applicable to polyvinylamides which are wholly composed of sulfite-stabilized glyoxalated vinylamide linkages and to polymers which comprise other linkages including those set forth above.

More in detail, with regard to the process, the formaldehyde can be added as formalin, as paraformaldehyde or as gaseous formaldehyde. Because of its ready availability and the ease with which it can be metered into the solution we prefer to employ formalin.

The formaldehyde is effective in reversing the above-described degradation over the pH range of about 8 to 4. The point at which most rapid and most complete reversal occurs per increment of formalin added has not been established but appears to be within the pH range of 7 to 5.

To avoid waste of formaldehyde while achieving substantially complete regeneration of the effectiveness of the polymer we add in the first instance 10% of formaldehyde, based upon the weight of vinyl monomer residues in the polymer (i.e., on the weight of the parent polymer), and vary the amount of formaldehyde on each side of this figure until the apparent optimum amount is found from a plot of the results.

Amounts are not critical, however, because we have found that an excess of added formaldehyde over that needed for virtually complete recovery of effectiveness does no harm.

Our evidence is that the formaldehyde is best added while the temperature of the solution is between about 10° C. and 30° C.

The minimum effective amount of formaldehyde for causing substantially complete reversal of the degradation has not been determined generally, but our laboratory work indicates that it varies with the amount of bisulfite and glyoxal present in the polymer and with the amount of polymer in the aqueous medium. It is consequently more convenient to determine this optimum by laboratory trial, employing larger and smaller amounts of formaldehyde on either side of an amount which is insufficient to cause complete reversal, and plotting the results. An excess of formaldehyde does not harm and hence we generally prefer to add to much formaldehyde rather than too little.

If desired, the formaldehyde can be added to the aged, deteriorated polymer solution in the state at which it is shipped. Thus formalin may be added to aged deteriorated polymer solution at room temperature immediately prior to use, the pH being adjusted as necessary for best results. Such solutions are manufactured and shipped at solids contents in the range of about 5%–15%.

It is possible also to gain the benefit of the present invention by adding the formaldehyde directly to the pulp, before, with, or after the polymer solution. Thus where (as is generally the case) the polymer solution is added to the fan pump of the papermaking machine, the formaldehyde can be added apart from the polymer at that place, or upstream, (e.g., to the discharge from the beater or refiner) or downstream (at the headbox). The pH of the pulp during addition of the formaldehyde and afterwards should be between 4 and 8, and preferably about 6. The polymer is almost instantly regenerated by the formaldehyde, and is substantially adsorbed as a cationic agent by the fibers immediately thereafter.

The aforesaid polymers develop their strengthening properties as they are dried in the temperature range of 190° F.–250° F., and introduction of the formalin requires no change in this schedule.

The invention is further illustrated by the examples which follow. These examples represent preferred embodiments of the invention and are not to be construed as limitations thereon.

EXAMPLE 1

The following illustrates the regeneration of the cationic potential of a typical thermosetting glyoxalated polyvinylamide according to the present invention.

A solution of a sulfite-stabilized glyoxalated polyacrylamide is prepared by first adding 15 g. of glyoxal to 100 g. of a 95:5 molar ratio acrylamide:diallyl dimethyl ammonium chloride copolymer in 900 cc. of water, allowing the solution to stand 8 hours at pH 6 and 20° C. for glyoxalation to occur, then adding 25 g. of sodium bisulfite as stabilizer, and allowing the solution to stand a further 4 hours to allow reaction of the bisulfite.

The wet strengthening efficiency of the solution is then determined by standard laboratory method, wherein 0.5% by weight of the sulfite-stabilized glyoxalated polymer (based on the weight of the polymer before reaction with glyoxal and bisulfite, and based on the dry weight of the fibers) is added to an aqueous solution of cellulose papermaking fibers at 0.6% consistency and pH 7. The suspension is gently stirred for a minute to permit adsorption of the polymer by the fibers to go to completion, after which the suspension is formed into wet handsheets having a basis-weight (dry basis) of 50 lb. per 25" x 40"/500 ream which are for one minute on a rotary drum drier heated by steam at 240° F. The wet tensile strength of the paper (sheet No. 1) is then determined by the TAPPI method.

The solution is aged for 4 weeks at 10% solids by weight, pH 4.5 and 35° C., and its wet strengthening efficiency is redetermined by the same method (sheet No. 2).

To 100 g. of the solution is then added 3 g. of formaldehyde (as 37% formalin) which provides about 10% of $CH_2O$ based on the weight of the parent polymer present. The solution is allowed to stand for a minute at 20° C. and pH 6 to allow the formaldehyde to react to chemical equilibrium, after which the wet strengthening efficiency of the solution is determined for the third time, as described above (sheet No. 3).

Results are as follows.

| Polyvinylamide used | Wet strength, lb./Inch |
|---|---|
| Sheet No.: | |
| 1 _____ Initial (before aging) _____ | 6.3 |
| 2 _____ After aging (before addition of $CH_2O$) _____ | 4.2 |
| 3 _____ After addition of $CH_2O$ _____ | 6.3 |

EXAMPLE 2

The procedure of Example 1 is repeated using a similar glyoxal-reacted sulfite-stabilized polyvinylamide prepared from a 90:10 molar ratio acrylamide:2-methyl-5-vinylpyridine copolymer.

Results are substantially the same.

EXAMPLE 3

The procedure of Example 1 is repeated using a similar glyoxal-reacted sulfite-stabilized polyvinylamide prepared from a 90:10 molar ratio acrylamide:2(t-butylamino) methyl acrylate.

Results are substantially the same.

EXAMPLE 4

The following illustrates the effect of pH on the rejuvenating action of formaldehyde.

100 cc. aliquots are taken from a 10% by weight aqueous solution of a glyoxalated and sulfite-stabilized 95:15 acrylamide:diallyl dimethyl ammonium chloride copolymer such as is described in Example 1, which has been aged for abou a month at pH 4.5 and 25° C. From experience it is known that the strengthening efficiency of the polymer has decreased by about 50%. The aliquots are respectively adjusted to pH 4.5, 6 and 8, and to each is added 32 g. of 37% Formalin solution which had been adjusted to the same respective pH, so that no pH change occurred. The strengthening efficiencies of the resulting solutions were then determined in standard laboratory manner, wherein in each instance sufficient of the solution, to provide 0.5% of the parent glyoxalated polymer based on the dry weight of the fibers, is added to an aqueous suspension of cellulose papermaking fibers having the same pH as the solution to be added, after which handsheets are formed and dried by a one-minute pass over a laboratory drum drier having a drum temperature of 240° F. The sheets have a basis weight of 49–51 lb. (25" x 40"/500 ream). Results are as follows:

| | pH [1] | Percent polymer [2] | Wet strength [3] |
|---|---|---|---|
| Run: | | | |
| 1 _____ | 4.5 | 0.5 | 3.2 |
| 2 _____ | 6.0 | 0.5 | 6.6 |
| 3 _____ | 7.0 | 0.5 | 6.0 |

[1] Of polymer solution, added formaldehyde and pulp.
[2] Based on dry weight of fibers.
[3] Lb. per inch.

The results indicate that best wet strength is obtained at about pH 6.

EXAMPLE 5

The following illustrates application of the process of the present invention to the commercial manufacture of paper towelling.

The polymer used corresponds to the sulfite-stabilized glyoxalated acrylamide:diallyl dimethyl ammonium chloride copolymer of Example 1 and is supplied as a 5% by weight solution at pH 4.5. The polymer is 18 days old, and a laboratory test shows that it has lost approximately 30% of its wet-strengthening efficiency.

The polymer solution is metered into the headbox of a commercial machine manufacturing paper towelling at a rate sufficient to supply 0.5% of polymer based on the dry weight of the fibers in the suspension. The wet strength of the towelling product is about 3 lb./inch.

There is then metered into the headbox an amount of formalin sufficient to supply 15% of formaldehyde based on the weight of the parent polymer in the polymer solution being supplied.

The wet strength of the towelling product is 4.1 lb/inch.

For the purposes of the present invention, materials which release formaldehyde when dissolved in aqueous medium can also be used, for example, di- and tri-methylol urea and water-soluble formaldehyde polymers including but not limited to urea-formaldehyde, triethylene polyalkylene polyamine resins and melamine-formaldehyde - polyalkylenepolyamine resins. Moreover, strong and active aldehydes other than formaldehyde can be used, for example, glyoxal, acetaldehyde, acrolein and pyruvaldehyde, together with materials which release these aldehydes in aqueous medium. The use of all these materials falls within the scope of our claims.

We claim:

1. Process for regenerating at least part of the wet strengthening efficiency of an age-deteriorated, sulfite-stabilized normally cationic thermosetting glyoxalated polyvinylamide wet strength resin in aqueous solution, which comprises reacting said polyvinylamide in said solution with formaldehyde at a pH between about 4 and 8.

2. A process according to claim 1 wherein the amount of formaldehyde which is reacted is sufficient to regenerate substantially all the cationic potential of said polyvinylamide.

3. A process according to claim 1 wherein the formaldehyde is reacted with the polyvinylamide at a temperature between 10° C. and 30° C.

4. A process according to claim 1 wherein the concentration of glyoxalated polyvinylamide in said solution is in excess of 5% by weight.

5. In the manufacture of wet strength paper wherein an age-deteriorated sulfite-stabilized thermosetting glyoxalated polyvinylamide wet strength resin is added to an aqueous acidic suspension of cellulose papermaking fibers having a pH between about 6 and 8, said polyvinylamide is adsorbed on said fibers, said fibers are formed into a web and said web is dried at a temperature between 190° F. and 250° F., the improvement which consists in adding formaldehyde to said suspension as agent regenerating at least part of the wet strengthening efficiency of said polyamide, according to claim 1.

6. A process according to claim 5 wherein the glyoxalated polyvinylamide is a glyoxalated 95:5 molar ratio acrylamide:diallyl dimethyl ammonium chloride copolymer.

References Cited
UNITED STATES PATENTS 2,616,818  11/1952  Azorlosa _____ 117—155
2,886,557  5/1959  Talet _____ 260—72

S. LEON BASHORE, Primary Examiner

F. FREI, Assistant Examiner

U.S. Cl. X.R.

162—168; 260—29.4, 29.6, 72, 73